E. H. LANIER & F. K. DRIESBACH.
PASTRY MAKING MACHINE.
APPLICATION FILED DEC. 17, 1909.
Reissued Aug. 6, 1912.
13,455.
2 SHEETS—SHEET 1.
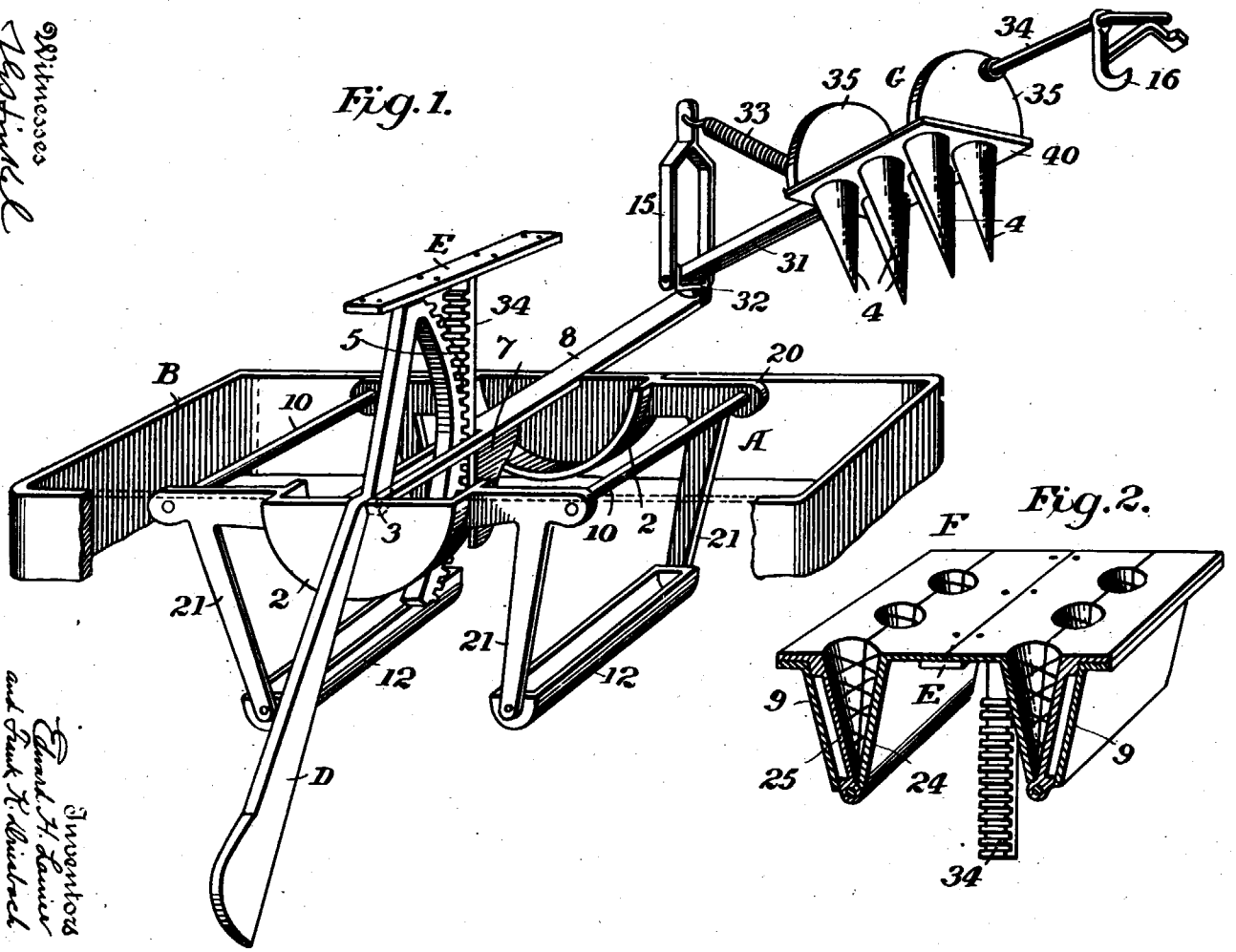
Witnesses
J. G. Stinkel
Milton Ottenberg.
Inventors
Edward H. Lanier
and Frank K. Driesbach
by Foster Freeman Watson & Coit
Attorneys

E. H. LANIER & F. K. DRIESBACH.

PASTRY MAKING MACHINE.

Reissued Aug. 6, 1912. APPLICATION FILED DEC. 17, 1909.

13,455.

2 SHEETS—SHEET 2.

Witnesses
J. G. Stinkel
Milton Ottenberg

Inventors
Edward H. Lanier
and Frank K. Driesbach
by Foster Freeman Watson & Coit
Attorneys

UNITED STATES PATENT OFFICE.

EDWARD H. LANIER AND FRANK K. DRIESBACH, OF CINCINNATI, OHIO.

PASTRY-MAKING MACHINE.

13,455. Specification of Reissued Letters Patent. Reissued Aug. 6, 1912.

Original No. 922,004, dated May 18, 1909, Serial No. 468,337. Application for reissue filed December 17, 1909. Serial No. 533,733.

*To all whom it may concern:*

Be it known that we, EDWARD H. LANIER and FRANK K. DRIESBACH, citizens of the United States, and residents of Cincinnati, Ohio, have invented certain new and useful Improvements in Pastry-Making Machines, of which the following is a specification.

Our invention relates to that class of pastry-making machines in which hollow articles are molded between dies, and consists in the combination with a section or male die, having any desired number of cores, of a section or female die having corresponding recesses and composed of two sections hinged together, with means for automatically opening and closing the sections and for supporting the parts so as to coat the cores and expose the dies properly to a heater and facilitate the manipulation of the parts, as fully set forth hereinafter and illustrated in the accompanying drawing, in which,—

Figure 3:
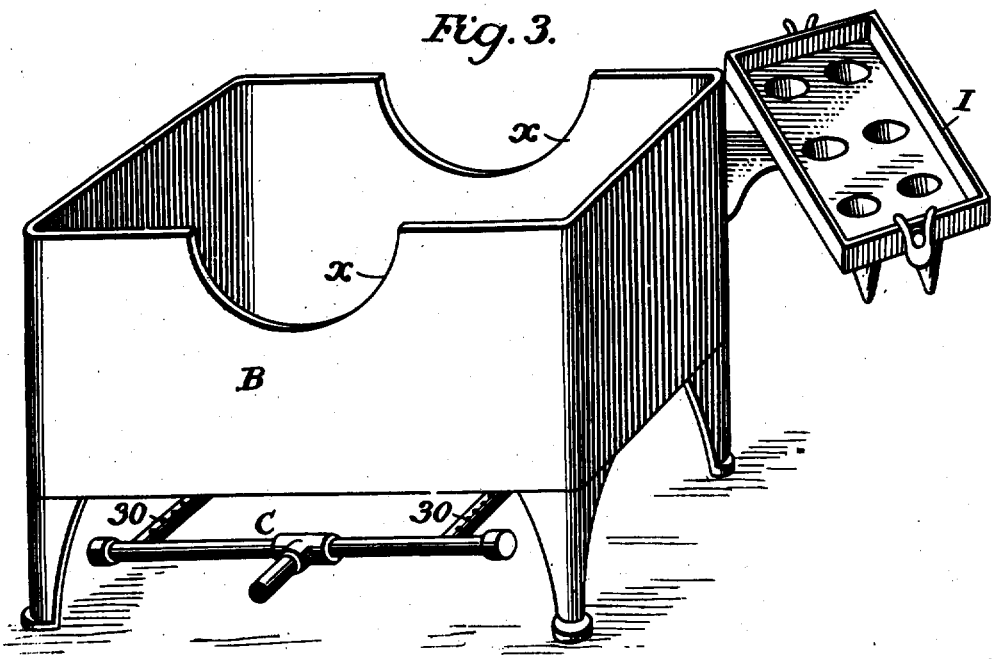
Figure 4:
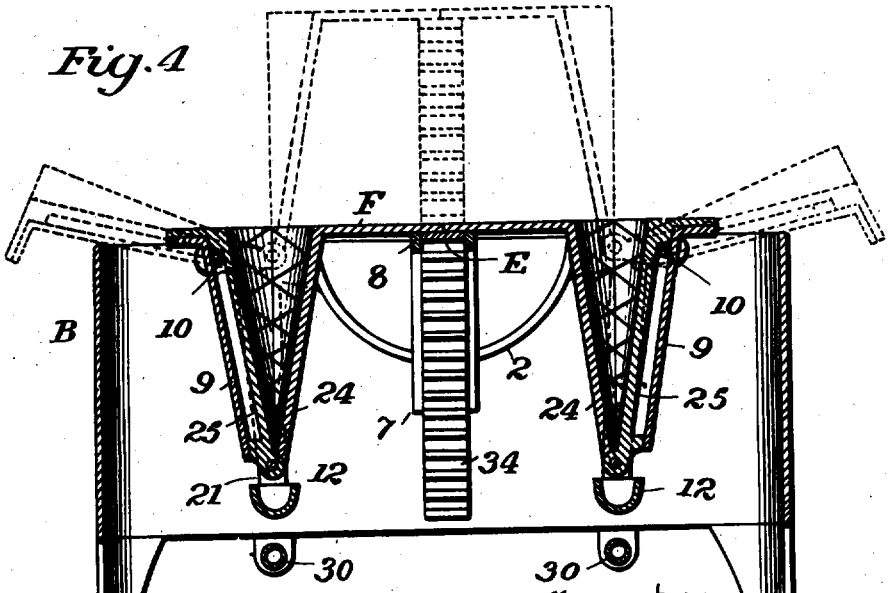

Figure 1 is a part sectional perspective view illustrating our improved apparatus, the sectional dies being removed in order that the other parts may be more fully exposed; Fig. 2 is a perspective sectional view showing the sectional dies drawn to a larger scale than Fig. 1; Fig. 3 is a perspective view of the heater casing and batter receptacle; and Fig. 4 is a cross-sectional elevation.

The dies employed for molding the pastry—shown as adapted to mold and bake what are ordinarily termed ice-cream cones—consist essentially of a male die G composed of a carrier 40 and any suitable number of cores or cones 4, supported thereby, and a female die F consisting of two sections 24, 25, hinged together at the lower ends and having sockets to receive the aforesaid cores. As shown there are two female dies and a corresponding number of sets of cores of the male die, but hereinafter we shall generally refer to the dies as consisting of a single male die and a single sectional female die, although it is obvious that any desired number may be employed.

The female die is supported by a carrier E of such construction and combined with such operating appliances that it may be raised and lowered to secure the automatic opening and closing of the die, a result which is effected by providing suitable bearings that will coact to separate the sections of the die F as the latter is raised, and bring them together and hold them as and after the die is lowered. To this end we prefer to provide the die F with a suitable inclined bearing adapted to a fixed bearing in such manner as to secure the desired operation upon the vertical movement of the die. Although the inclined bearing of the die F may be formed by means of the side of a groove at the end of the hinged member or section of the die, as shown, it consists of an inclined bar or blade 9 arranged sufficiently beyond the side of the die to permit the intermediate passage of a fixed bearing in the form of a rod 10. With this arrangement when the die F is raised the action of the bearings will be to open the dies, thus permitting the withdrawal of the material baked therein and upon lowering the die the hinged section will be closed against the other section which is rigidly attached to its support. In the construction shown the support consists of a carrier E provided with a rack 34 for engaging the teeth of a curved rack 5 upon an operating lever D fulcrumed at 3 upon a suitable support. As shown the support is in the form of a frame A having side bars 20 between which extend the bearing rods 10, which further act to brace the bars 20 and form part of the frame, and the rack 34 slides in a groove in and is guided by a bracket 7 on an axial rod 8 of the frame A, the pivot or bearing of the lever D being in one of the cross bars 20. As shown each of the cross bars has a semicircular projection 2 constituting an end bearing adapted to the curved recesses $x$ in the heater casing B, so that the frame A may be inserted in said casing to be swung therein, as hereinafter described, turning upon the said bearings $x$.

The male die carrier 40 is connected by an arm or rod 31 to a swivel 32 at the outer end of the axial bar or arm 8, which extends beyond the cross bar 20, the arrangement being such that the male die may swing to one side to introduce its cores into batter in a suitable batter receptacle I, supported by a bracket at the outside of the casing B, and the carrier 40 may, after the cores are thus coated, be raised and swung to a position over the female die, and then lowered to introduce the cores into the sockets of the die F.

To aid in supporting the male die the bar 8 is provided with a standard 15, which may be connected to swing with the swivel 32 and between which and the arm 31 extends a supporting spring 33, which tends to maintain the male die in its elevated position but will yield to permit it to be depressed.

The cores are introduced into the female die when the latter is in its depressed position, and when the cores have thus been fully introduced an arm 34, which extends from one of two curved projections 35, 35 at the end of the carrier 40, is brought parallel to the lever D, and may then be connected thereto by a link 16, and this permits the frame A to be swung upon its bearings $x$ in the casing B, the semicircular projections 2 and 35 coinciding and forming together at each end of the frame a circular bearing which can rotate in the bearing $x$ of the casing B as the frame A is rotated. This permits the dies to be subjected at all portions to the action of a heater C, which, as shown, consists of perforated gas pipes 30, but may be of any suitable construction. After the material has been properly baked the frame A is brought to the position shown in Fig. 1; the male die is elevated and carried to one side as shown in said figure, and the carrier E is raised, when the sections of the die F will be separated to permit the removal of the baked material.

In order to hold the baked material in the die F rather than have it adhere to the cores, the interior of each socket of said die may be serrated.

In order to protect the ends of the sectional dies from excessive heat, inasmuch as they are nearer to the heater than the other portions, we provide suitable guards in the form of curved cross plates 12 supported by arms 21 on the frame A in such a position as to be below the ends of the sectional dies.

Inasmuch as our invention may be embodied if but a single sectional die and a carrier having a number of cores corresponding to the sockets in the said die is employed, we shall in our claims hereinafter generally refer to a single die only, but it will of course be understood that a plurality of dies may be combined to operate in like manner as shown in the drawing.

The particular form of machine embodying our invention which is illustrated and described herein, contains many novel features invented solely by Edward H. Lanier and described and claimed in an earlier application, Serial No. 422,516, filed by him on March 21, 1908. Therefore no claim is made herein for the features common to the present machine and the one illustrated and described in said application of Edward H. Lanier.

Without limiting ourselves to the construction shown, we claim:

1. The combination in a pastry making machine of a frame, a series of cores, a core carrier connected to be carried into position over and away from the frame, a die carrier, means for raising and lowering said carrier in respect to the frame, a die section rigidly connected with the carrier, a die section hinged to the other section, and bearings on the hinged section and frame arranged to swing the hinged section out and in as the carrier is raised and lowered, after the core carrier is moved from above the die.

2. The combination in a pastry making machine, of a swinging frame, a die carrier, means for raising and lowering said carrier in respect to the frame, a die section rigidly connected with the carrier, a die section hinged to the other section, and bearings on the hinged section and frame arranged to swing the hinged section out and in as the carrier is raised and lowered.

3. In a pastry making machine, the combination of a swinging frame, a die carrier, means on the frame for raising and lowering said carrier, a sectional die supported by said carrier, one section being hinged to swing to and from the other, and bearings relatively arranged on the swinging die section and frame to close the die sections together as the carrier is lowered.

4. In a pastry machine, the combination of a swinging frame, a die carrier, a sectional die carried by said carrier, a rack connected with the carrier and supported and guided in said frame, a rack lever engaging the rack of the carrier and vibrating on the frame, and means for opening and closing the die as the carrier is raised and lowered.

5. The combination in a pastry making machine, of a frame provided with end bearings for supporting it in position to swing about a horizontal axis, a die carrier, a lever and connections for raising and lowering the carrier on the frame, die sections hinged together and supported by said carrier, and bearings on the die and frame relatively arranged to separate the die sections as the carrier is raised and to close them as it is lowered.

6. The combination with the swinging frame of a pastry making machine, of a sectional female die, a carrier therefor vertically movable in the frame, a second carrier provided with cores adapted to sockets in the female die, and means connecting the second carrier to the frame and permitting it to swing to and from the female die carrier.

7. The combination in a pastry making machine, of a swinging frame, a female die carried thereby, an arm extending laterally from said frame, a die carrier provided with cores adapted to sockets of the female die, and a connecting rod attached to the said die carrier, and connected with said arm on the body of the swinging frame by means permitting the cores to be moved to and from the swinging frame and also to one side of said frame.

8. The combination in a pastry making machine, of a swinging frame, a female die carried thereby, an arm extending from said frame, a die carrier provided with cores adapted to sockets of the female die, a connecting rod pivoted to the said arm and attached to the said die carrier, and a spring connected to lift the die carrier.

9. The combination in a pastry making machine, of a swinging frame, a sectional die, a carrier therefor provided with a rack bar, guides for said rack bar on the frame, and a lever pivoted to swing on the frame and provided with teeth engaging those of the rack.

10. The combination in a pastry making machine, of a swinging frame, a sectional die, a carrier therefor, means for raising and lowering the carrier, and a guard carried by the frame below the die for the purpose set forth.

11. The combination in a pastry making machine, of a frame having end bearings, and guide rods, a die carrier, means for raising and lowering said carrier on the frame, and sectional dies supported by said carrier, and provided with inclined bearings engaging said guide rods.

12. The combination in a pastry making machine, of a frame having end bearings, an axial bar, and guide rods, a die carrier, means for raising and lowering said carrier on the frame, sectional dies supported by said carrier, and having inclined bearings engaging said guide rods, and a die carrier provided with cores and movably connected with said bar.

13. The combination in a pastry making machine, of a swinging frame, a die carrier movable thereon, a rack lever pivoted to the frame for operating said carrier, an arm extending from the frame, a core die carrier pivotally connected with said arm, an arm extending from said core die carrier in position to be brought parallel to said lever, and means for connecting the arm and lever detachably together.

14. The combination in a machine of the character described, of a supporting frame, a female die carried by said frame, a male die supported to move to and from the female die and also adapted to be adjusted about a vertical axis to a position beyond a side of the female die, and a heater within the supporting frame.

15. The combination in a machine of the character described, of a supporting frame, a female die carried by said frame, a batter receptacle, and a male die supported to move about one axis into alinement with either the batter receptacle or the female die and about another axis substantially at right angles to that aforesaid to and from said receptacle and die.

16. The combination in a machine of the character described, of a female die, means supporting said die and permitting it to swing about a horizontal axis, a male die supported to swing with the female die and independently movable into and from the female die and about a vertical axis laterally thereof and means for heating the female die.

17. The combination in a machine of the character described, of a female die, means supporting said die and permitting it to swing about a horizontal axis, an arm connected with the female die to swing therewith, a male die connected with said arm by a joint permitting it to swing, independently of the female die to and from the female die about a horizontal axis and transversely thereof about a vertical axis, and means for heating the female die.

18. The combination in a machine of the character described, of a plurality of female dies, connected to a common carrier, means supporting said carrier and permitting it to swing about a horizontal axis, a plurality of male dies and a carrier for the latter dies connected with the carrier for the female dies to swing therewith and also for movement to and from and transversely of the female dies independent of any movement of the female dies.

19. A machine of the character described having in combination, a casing, a female die carrier mounted in bearings in said casing, a plurality of female dies in said carrier, a male die carrier connected with the aforesaid carrier by a universal joint and supporting a plurality of male dies corresponding in number and relative arrangement to the female dies and a burner below said die carriers.

20. The combination, in a machine of the character described, of a suitable casing, a frame mounted in bearings in opposite side walls of the casing, a series of female dies supported by said frame, an arm projecting from said frame beyond the side of the casing, a series of male dies corresponding in number and relative arrangement to the female dies, a support for the male dies pivotally connected with said laterally projecting arm beyond the casing in such manner that the male dies can be moved to and from and transversely of the female dies without movement of the female dies, and a heating device within the casing.

21. The combination, in a machine of the character described, of a suitable casing, a frame mounted in bearings in opposite side walls of the casing, a series of female dies supported by said frame, a horizontal arm projecting from said frame beyond the side wall of the casing, a second arm connected with the first said arm beyond the casing and in such manner that it can be vibrated on both horizontal and vertical axes, a plurality of male dies carried by the second arm and corresponding in number and relative arrangement to the female dies, and heating means within the casing.

22. The combination, in a machine of the character described, of a male die, a female die, supports for said dies connected by a universal joint, and a batter receptacle cooperating with the male die.

23. The combination, in a machine of the character described, of a plurality of male dies, a plurality of female dies corresponding in number and relative arrangement to the female dies, supports for said dies connected by a universal joint, and a batter receptacle.

24. The combination, in a machine of the character described, of a series of female dies, supporting means for said dies permitting them to rotate about a horizontal axis, male dies adapted to be adjusted to and from the female dies and to rotate with the latter when in engagement therewith, the female dies being vertically movable with respect to their supporting means when the male dies are withdrawn therefrom and comprising a plurality of laterally separable sections, and means for heating the dies.

25. The combination, in a machine of the character described, of a series of female dies, supporting means for said dies permitting them to rotate about a horizontal axis, male dies adapted to be adjusted to and from the female dies and to rotate with the latter when in engagement therewith, the female dies being vertically movable with respect to their supporting means when the male dies are withdrawn therefrom and comprising two sections hinged together at one end, whereby when said dies are elevated from their rotatable support the contents thereof may be readily removed, and means for heating the dies.

26. The combination, in a machine of the character described, of a burner or heating device, a series of female dies mounted to rotate about a horizontal axis above the heating device, male dies movable to and from engagement with the female dies and adapted to rotate with the latter when in engagement therewith, means for shifting the female dies vertically when the male dies are withdrawn therefrom, and means whereby the female dies will be automatically opened laterally during such vertical movement.

27. The combination, in a machine of the character described, of a burner or heating device, a series of female dies each comprising two sections pivotally connected at the closed end of the die, a rotatable support for said dies, whereby either end thereof may be brought adjacent the heating device, male dies movable to and from the female dies and adapted to rotate with the latter when in engagement therewith, means for moving the female dies vertically when the male dies are withdrawn therefrom, and means for positively opening the female dies by rocking one of the sections thereof about its pivotal support during such vertical movement.

In testimony whereof we have signed our names hereto in the presence of two witnesses.

EDWARD H. LANIER.
FRANK K. DRIESBACH.

Witnesses:
GEO. W. TIBBLE,
PHIL KIEHWORTH.